Dec. 21, 1926.
S. J. CLULEE
1,611,581
EYEGLASS CONSTRUCTION
Filed August 14, 1922
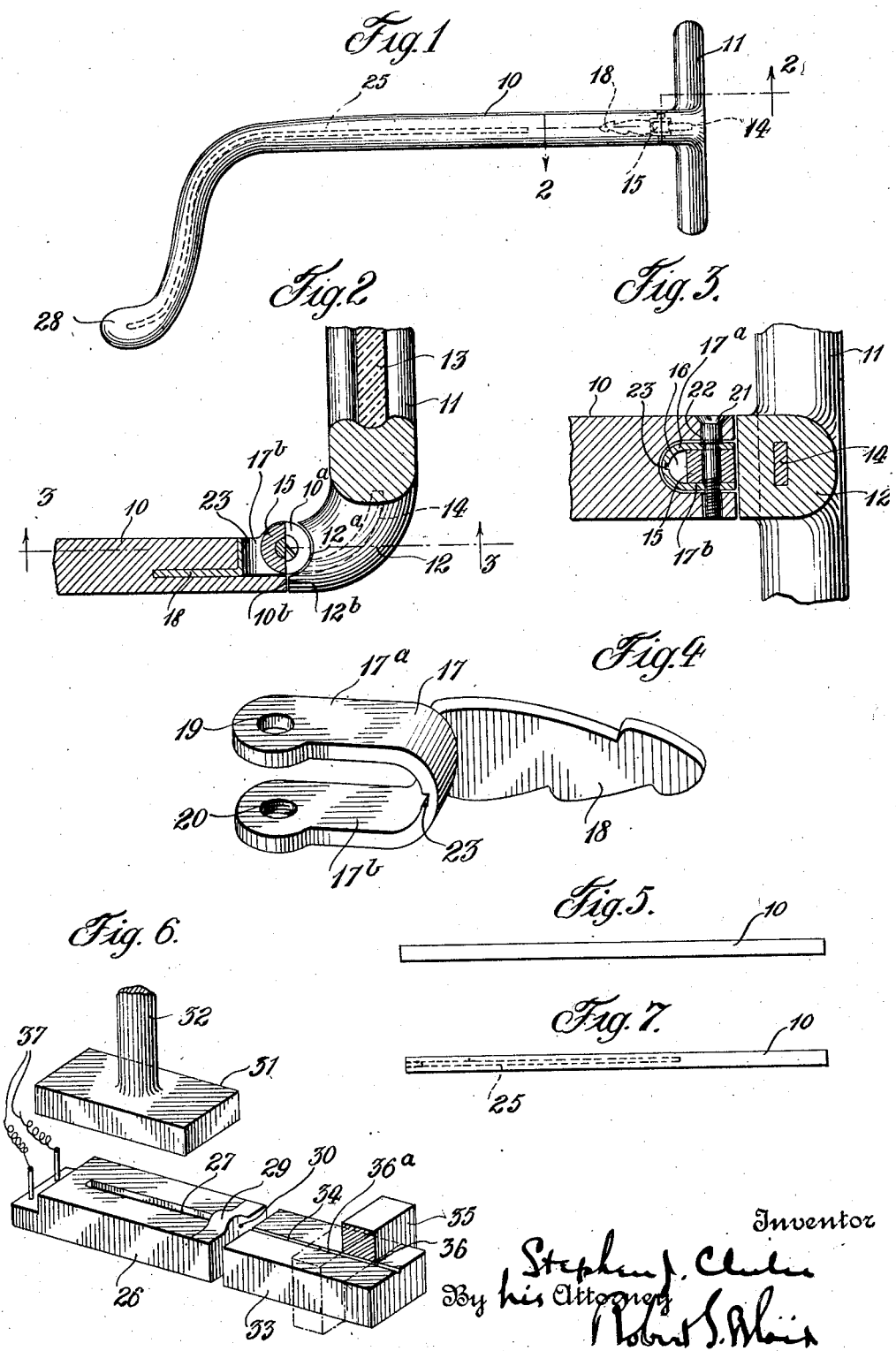

Patented Dec. 21, 1926.

1,611,581

UNITED STATES PATENT OFFICE.

STEPHEN J. CLULEE, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed August 14, 1922. Serial No. 581,666.

This invention relates to eyeglass construction. One of the objects thereof is to provide a construction of the above nature which is strong and dependable and well adapted to meet the conditions of hard, practical use. Another object is to provide a construction of the above nature in which the various parts are dependably held in assembled relation and formed in such a manner as to be unaffected by long-continued service and wear. Another object is to provide a practical and efficient art whereby eyeglass parts may be rapidly and conveniently made at low cost with inexpensive apparatus. Other objects will be in part obvious or in part pointed out hereinafter.

The invention accordingly consists in the features of construction, combinations of elements and arrangements of parts and in the several steps and relation and order of each of the same to one or more others thereof, all as will be illustratively herein described, and the scope of the application of which will be indicated in the following claims.

In the accompanying drawing, in which are shown one of the various possible embodiments of this invention and an illustrative representation of an art of making certain parts thereof—

Figure 1 is a side elevation of a pair of eyeglasses;

Figure 2 is a partial plan view, partly in section, of the eyeglasses shown in Fig. 1, the section being taken along the line 2—2 of Fig. 1;

Figure 3 is a sectional elevation of the construction shown in Fig. 2, the section being taken along the line 3—3 of Fig. 2;

Figure 4 is a perspective in enlarged detail of one of the parts shown in the preceding figures;

Figure 5 is a side elevation in reduced scale of the temple bar shown in Fig. 1 at an early stage of its construction;

Figure 6 is a perspective of an apparatus for constructing temple bars; and

Figure 7 is a view similar to Fig. 5 showing a temple bar after leaving the apparatus shown in Fig. 6.

Similar reference characters refer to similar parts throughout the several views of the drawings.

Referring now to the drawings in detail, in Fig. 1 there is shown a side view of a pair of eyeglasses showing a temple bar 10 and its connection with an eyeglass rim 11. The temple bar 10 and the eyeglass rim 11 are preferably of some non-metallic substance such as, for example, celluloid. Formed integral with the rim 11 or secured thereto in any suitable manner is a part 12 which projects outwardly from the side thereof and rearwardly, as clearly shown in Fig. 2. An eyeglass lens 13 is shown in Fig. 2 seated within the rim 11. The end of the part 12 is preferably formed to the shape of a curve as shown at $12^a$ in Fig. 2, and the end of the temple bar 10 is preferably rounded as at $10^a$ to mate therewith and is provided with a shoulder $10^b$ to mate with a shoulder $12^b$ formed at the end of the part 12 as shown. The joint thus formed between the part 12 and the temple bar 10 presents a neat and compact appearance.

Projecting from the end of the part 12 is a metal member which comprises an elongated end 14 embedded in the part 12 and a projecting lug 15 of substantially cylindrical shape and provided with an opening through its center. Adjacent its end the temple bar 10 is provided with a portion hollowed out as at 16, shown clearly in Fig. 3, and within this hollow portion is seated a metal member 17, preferably of substantially U-shape which is shown in enlarged detail in Fig. 4. Between the two spaced sides $17^a$ and $17^b$ of the U-shaped member 17 rests the lug 15 projecting from the part 12. Connected to the member 17 or formed integral therewith is an end 18 which extends rearwardly along the temple bar 10 and is embedded therein. The part 18 is preferably formed with an irregular contour, as shown, to insure its holding securely in the celluloid. The two spaced parts $17^a$ and $17^b$ of the member 17 are provided with oppositely disposed openings 19 and 20 one of which, as 20, is threaded.

Turning now to Fig. 3, there is shown a screw 21 countersunk in the top of the temple bar 10 and passing through the opening 19 in the part $17^a$ through the opening in the lug 15 and threaded into the opening 20 in the part $17^b$. The screw 21 is preferably provided with a shoulder 22 which abuts the upper surface of the part $17^a$. The temple bar 10 is thus pivoted by the screw 21 to the part 12 and the eyeglass frame 11, the bearing surfaces being between the parts 17ᵃ and 17ᵇ and the upper and lower surfaces of the lug 15, respectively.

The swinging of the temple bar 10 upon its pivot screw 21 is apt to cause considerable wear upon the bearing surfaces of the parts 17ᵃ and 17ᵇ and the lug 15 and the resultant looseness may cause a sagging or drooping of the temple bar 10 which is highly objectionable. The U-shaped member 17 is preferably of light construction and therefore the thickness of the part 17ᵇ permits of only a few threads within the opening 20. Therefore, if it is desired to draw the two parts 17ᵃ and 17ᵇ together to take up wear and clamp the lug 15 more securely, the threads in the opening 20 may not prove of sufficient strength to withstand the force required to bend the U-shaped member and draw the two parts 17ᵃ and 17ᵇ together. To make provision for readily taking up wear and without adding to the weight of the structure nor reducing its efficiency in any way, a transverse groove is provided at some point in the surface of the member 17, for example, as shown at 23 in Fig. 4 and also in Figs. 2 and 3. The groove 23 acts to weaken the metal slightly and just enough to permit the two parts 17ᵃ and 17ᵇ to be conveniently and safely drawn together by the screw 21 to take up wear.

Turning back to Fig. 1, embedded in the temple bar 10 there is shown a metal reinforcing member 25 which serves to strengthen the temple bar and to hold it in the desired curved shape to rest over the ear of the wearer of the eyeglasses. A method of introducing the metal member 25 into the temple bar 10 is illustratively shown in Figs. 5, 6 and 7, to which reference will now be had.

Referring to Fig. 5 there is shown the temple bar member 10 as a straight bar of celluloid before being formed to the finished shape shown in Fig. 1. Referring to Fig. 6, there is shown a metal block 26 which comprises substantially a die member having a groove 27 formed therein and shaped to receive the celluloid bar 10. The block 26 is preferably provided with an upwardly projecting part 29 at one end of the groove 27 and in the projecting part 29 is formed an opening 30 substantially the size of the wire reinforcing member 25 and positioned to be substantially in line with the axis of the bar 10 when the latter is placed within the groove 27. The second block 33 is provided with a groove 34 adapted to receive the reinforcing wire 25 and positioned to be in line with the opening 30. Positioned upon the block 33 is a sliding block 35 which is shown partly in phantom view in the drawings and which is provided with a downwardly projecting part 36 resting in the groove 34. The part 36 has a forwardly projecting part 36ᵃ resting in the groove 34 and formed to extend through the opening 30 and to a short distance beyond the part 29 when the block 35 is thrust up against the part 29 of the block 26.

The celluloid bar 10, as shown in Fig. 5, is placed within the groove 27 in the block 26, and a block, as 31, provided with a handle 32 is placed thereon to hold the bar 10 securely in place, the two blocks 26 and 31 coacting to form a substantially enclosed recess for the celluloid bar 10. The block 26 is then heated preferably by electric current, the contacts being shown at 37, to a temperature sufficiently high to soften the temple bar 10 within the groove 27. The block 35 is then slid to the right on the block 33 and the wire reinforcing member 25 is placed in the groove 34 with one end in contact with the part 36ᵃ, and the other end is guided into the opening 30. The block 35 is then thrust to the left and the lug 36ᵃ forces the wire 25 through the opening 30 and into the softened temple bar 10, the lug 36 projecting to a sufficient length through the opening 30 to drive the wire 25 into the bar 10 to a position substantially as shown in Fig. 7. The block 35 is then withdrawn to the right and the bar 10, after being sufficiently cooled, is removed from the groove 27. The softened celluloid at the end of the bar 10 is molded over the end of the wire 25 as shown at 28 in Fig. 1, thus closing the opening left by the passage of the wire 25 and the insertion of the lug 36ᵃ. The temple bar may now be formed to a desired shape, for example, as shown in Fig. 1, and the reinforcing wire 25 serves to hold it in shape and reinforce it against distortion or breakage.

It will thus be seen that there is herein provided an eyeglass construction which is strong and dependable, capable of withstanding the conditions of hard, practical use, and which is yet simple and inexpensively made.

As many possible embodiments may be made of the mechanical features of the above invention and as the art herein described might be varied in various parts, all without departing from the scope of the invention, it is to be understood that all matter herein set forth or shown in the accompanying drawings is to be interpreted as illustrative and not in a limiting sense.

I claim as my invention:

1. In eyeglass construction, in combination, a non-metallic temple bar having in the forward end thereof a rearwardly extending recess opening on the inner side of the temple bar and the forward end thereof and closed on the top and bottom and outer side thereof, a substantially U-shaped member in said recess, the two sides thereof resting against the top and bottom walls of said recess and the ends thereof extending forwardly, said U-shaped member being formed of thin sheet-like metal and having a part integral therewith and bent substantially at right angles to the sides thereof extending rearwardly therefrom and anchored in said temple bar to secure said U-shaped member in place, a non-metallic eyeglass rim having a part projecting outwardly and rearwardly and meeting the forward end of said temple bar, a metal lug projecting rearwardly from said part of said rim and between said two sides of said U-shaped member, and a connecting screw passing through one side of said U-shaped member, through said lug, and threaded into the other side of said U-shaped member.

2. In eyeglass construction, in combination, a non-metallic temple bar having in the forward end thereof a rearwardly extending recess opening on the inner side of the temple bar and the forward end thereof and closed on the top and bottom and outer side thereof, a substantially U-shaped member in said recess, the two sides thereof resting against the top and bottom walls of said recess and the ends thereof extending forwardly, said U-shaped member being formed of thin sheet-like metal and having a part integral therewith and bent substantially at right angles to the sides thereof extending rearwardly therefrom and anchored in said temple bar to secure said U-shaped member in place, a non-metallic eyeglass rim having a part projecting outwardly and rearwardly and meeting the forward end of said temple bar, a metal lug projecting rearwardly from said part of said rim and between said two sides of said U-shaped member, and a connecting screw passing through the non-metallic material of said temple bar above said U-shaped member, through the upper side of said U-shaped member, through said lug and threaded into the other side of said U-shaped member, said screw having a shoulder spaced from the head thereof adapted to engage the top surface of said upper side of said U-shaped member to limit its movement into said non-metallic material and to permit drawing together the two sides of said U-shaped member to clamp said lug.

3. In eyeglass construction, in combination, a non-metallic temple bar having in the forward end thereof a rearwardly extending recess opening on the inner side of the temple bar and the forward end thereof and closed on the top and bottom and outer side thereof, a substantially U-shaped member in said recess, the two sides thereof resting against the top and bottom walls of said recess and the ends thereof extending forwardly, said U-shaped member being formed of thin sheet-like metal and having a part integral therewith and bent substantially at right angles to the sides thereof extending rearwardly therefrom and anchored in said temple bar to secure said U-shaped member in place, a non-metallic rim member having a rearwardly directed surface mating with the forward end of said temple bar, a metal lug projecting from said surface and extending between said two sides of said U-shaped member, and a screw member for drawing together the two sides of said U-shaped member to clamp said lug and pivotally connecting said temple bar and said rim.

4. In eyeglass construction, in combination, a non-metallic temple bar, an eyeglass rim member, a hinge connecting said temple bar and said rim comprising a member having a pair of spaced metal parts embedded in said temple bar substantially concealed thereby and a metal lug between said spaced parts, and a screw member passing through one of said spaced parts, through said lug and threaded into the other of said spaced parts, said member having means adapted to permit drawing together by means of said screw of said two spaced parts to clamp said lug and take up wear without endangering said threads.

5. In eyeglass construction, in combination, a rim member, a temple bar member, a metal lug connected to one of said members, a metal member comprising two spaced parts connected to the other of said members and adapted to embrace said lug, and a connecting member passing through said lug and said two spaced parts to pivotally connect them, said last metal member having a portion thereof weakened adapted to permit drawing together said two spaced parts to take up wear and to clamp said lug.

6. In eyeglass construction, in combination, a non-metallic rim member, a non-metallic temple bar member, a substantially U-shaped metal member connected to one of said members, a metal lug connected to the other of said two members and adapted to be received between the two sides of said U-shaped member, and a connecting screw passing through said lug and said U-shaped member to pivotally connect them together, said U-shaped member having a portion thereof weakened to permit drawing together of said two sides thereof to take up wear.

7. In eyeglass construction, in combination, a temple bar member of non-metallic material having in the forward end thereof a rearwardly extending recess opening on the inner side of the temple bar and at the forward end thereof and closed on the top and bottom and outer side thereof, a substantially U-shaped metal member in said recess, the two sides thereof resting against the top and bottom walls respectively of said recess and the open end thereof extending forwardly, said U-shaped metal member having a part extending rearwardly from the rear end thereof and anchored in said non-metallic material to secure said U-shaped member in place.

8. In eyeglass construction, in combination, a temple bar member of non-metallic material having in the forward end thereof a rearwardly extending recess opening on the inner side of the temple bar and at the forward end thereof and closed on the top and bottom and outer side thereof, a substantially U-shaped metal member in said recess, the two sides thereof resting against the top and bottom walls respectively of said recess and the open end thereof extending forwardly, said U-shaped member being bent from sheet metal and having a part integral therewith extending rearwardly into said non-metallic material and anchored therein, said part being joined to said U-shaped member at one side of the closed rear end thereof.

In testimony whereof, I have signed my name to this specification this 3rd day of August, 1922.

STEPHEN J. CLULEE.